United States Patent
Smith

Patent Number: 5,406,433
Date of Patent: Apr. 11, 1995

[54] DUAL MAGNETORESISTIVE HEAD FOR REPRODUCING VERY NARROW TRACK WIDTH SHORT WAVELENGTH DATA

[75] Inventor: Neil Smith, San Diego, Calif.

[73] Assignee: Eastman Kodak Company, Rochester, N.Y.

[21] Appl. No.: 160,563

[22] Filed: Dec. 1, 1993

[51] Int. Cl.⁶ .............................................. G11B 5/30
[52] U.S. Cl. .................................... 360/113; 360/126; 338/32 R
[58] Field of Search ...................... 360/113, 125, 126; 338/32 R

[56] References Cited

U.S. PATENT DOCUMENTS

| | | | |
|---|---|---|---|
| 4,878,140 | 10/1989 | Gill et al. | 360/113 |
| 5,081,554 | 1/1992 | Das | 360/126 |
| 5,084,794 | 1/1992 | Smith | 360/113 |
| 5,140,267 | 8/1992 | Shintaku | 338/32 R |
| 5,155,642 | 10/1992 | Voegeli | 360/113 |
| 5,155,643 | 10/1992 | Jones, Jr. et al. | 360/113 |
| 5,193,038 | 3/1993 | Smith | 360/113 |
| 5,206,590 | 4/1993 | Dieny et al. | 338/32 R |
| 5,323,285 | 6/1994 | Smith | 360/113 |

Primary Examiner—Stuart S. Levy
Assistant Examiner—Jefferson Evans
Attorney, Agent, or Firm—William F. Noval

[57] ABSTRACT

The invention relates to a dual magnetoresistive head (DMR) having a narrow track-width, defined as equal to or less than 10 times the height of its MR elements, for use in reproducing signals having short wavelengths greater than 100 kiloflux changes per inch. The track width reduction to less than 10 times the MR element height introduces new parameters into the determination of the DMR signal response. In particular, the directional sense of the magnetization vectors along the longitudinal axes of the two MR elements join with the transverse bias field direction and the signal field direction in determining the head response; that is, the head's performance is now determined by its "three dimensional" characteristics, rather than the "two dimensional" characteristics as in the prior art. In the "symmetric" DMR, the longitudinal bias component in each of the DMR's magnetoresistive elements are parallel and oriented in the same direction, while in the "antisymmetric" DMR the longitudinal bias components are parallel but are oriented in opposite directions. The symmetric DMR has an off-track response which allows it to possibly serve simultaneously as a tracking head as well as a data reproduce head, while the antisymmetric DMR has a data signal output that can be more than twice that of the symmetric DMR.

9 Claims, 4 Drawing Sheets

DUAL MAGNETORESISTIVE HEAD FOR REPRODUCING VERY NARROW TRACK WIDTH SHORT WAVELENGTH DATA

BACKGROUND OF THE INVENTION

1. Field of the Invention

This invention relates to magnetic recording, and in particular to a dual magnetoresistive head (DMR) for reproducing short wavelength, very narrow trackwidth digital data.

2. Description Relative to the Prior Art

The trend in digital disk recording systems continues in the direction of higher areal recording densities. This trend provides increased efficiency in the use of the recording medium, and contributes to the overall compactness and reduction in size of current computers. At the present time, linear recording densities of 50 kilo flux changes per inch and track densities of 2500 tracks per inch result in readily available areal densities of 125 megabits per square inch.

An important component in attaining higher areal densities has been the MR reproduce head utilized in conjunction with a inductive record head. Both shielded and unshielded single element MR heads are known in the art, and each configuration has its advantages and its limitations. However, both configurations provide advantages which include independence of output level on head/media velocity and optimization of the write and read functions of the combined inductive write/ MR read transducer.

The dual MR head (DMR) having a pair of unshielded MR elements as disclosed in U.S. Pat. No. 5,084,794 provides the additional advantages of ease of head fabrication, excellent short wavelength response, a self biasing characteristic, and freedom from MR element shorting problems present in other biased MR head configurations. U.S. Pat. No. 5,084,794 is hereby incorporated by reference.

Referring to FIG. 1, a typical DMR 10 known in the prior art consists of two magnetically, electrically and geometrically matched MR elements 12,14. In this DMR embodiment, the MR elements 12,14 are separated over substantially their entire lengths by an electrically conductive spacer 16. A sense and biasing current 22 flowing to the head 10 via leads 24,26 divides between the two MR elements 12,14 into two equal currents 28,30 because the MR elements 12,14 are identical; a small portion of the current 22 flows in the spacer 16. The DMR 10 is shown in contact with a magnetic medium 11.

The thin film MR elements 12,14 are rectangular in shape. This configuration results in the shape anisotropy of the MR film being directed along the longitudinal axis of the film, which is also the direction of its unbiased magnetization. Static bias fields generated by the flow of sense current rotate the magnetization from this axial direction, and the signals from the magnetic medium further modulate the angular position of the magnetization, changing the film resistance. The currents 28,30 flowing in the same direction in the MR elements 12,14 generate magnetic fields that result in the mutual biasing of the MR elements 12,14 because each of the MR elements, as well as being a field detection element, acts as a soft adjacent biasing layer for the other. The bias field He at element 12 due to this self-biasing mechanism, is equal in magnitude and opposite in sign to the bias field $-H_B$ at the element 14. In biasing the MR elements 12,14 the magnetic field $H_B$ rotates the magnetization of the MR element 12 in one direction, and the field $-H_B$ rotates the magnetization of the MR element 14 in the opposite direction. It will be noted that the biasing fields $H_B$ and $-H_B$ due to the sense current have essentially no longitudinal components; they solely lie along the height directions of the MR element 12,14.

The MR and DMR heads of the prior art have usually been characterized by track widths equal to or greater than 10 times the MR element height. For example, in the above referenced patent the disclosed DMR has a track width of 50 microns and an MR element height of 5 microns. This large ratio of longitudinal extension to height in the heads of the prior art means that operation of the head is essentially "two dimensional" in nature. That is, characteristics of the head operation are determined in the plane perpendicular to that of the longitudinal axis of the MR element, and neither the head sensitivity nor the signal fields from the recorded medium vary appreciably in the longitudinal direction over the active area of the MR element.

For an understanding of the operation of the narrow track width DMR for use in short wavelength signal reproduction, it is advantageous to consider the general signal response mechanism of the MR elements. There are essentially two mechanisms for generation of the MR reproduce signal; 1) direct signal field coupling, and 2) surface-field coupling plus flux propagation. The former accounts for the circumstance when the average (that is, over the MR element active volume) magnetic field emanating from the recorded medium is sufficiently large to directly induce modulation of the MR element magnetization to be observable as magnetoresistive signal. At high ( or even at moderate) linear recording densities, the fields from the medium die off extremely rapidly over distances of the order of typical element heights, and the MR response is due predominately, if not exclusively, to the second mechanism. In this case, the fields from the medium, being essentially non-negligible only at the medium's surface, enter the MR element at the head/medium interface and this surface flux is then internally propagated up into and through the remainder of the MR element. It is this second mechanism which primarily determines the response of the DMR of the present invention to high recording density signals.

SUMMARY OF THE INVENTION

The invention relates to a DMR having a narrow track width, defined as equal to or less than 10 times the height of its MR elements, for use in reproducing signals having short wavelengths, for example, greater than 100 kiloflux changes per inch. A storage device using a head in accordance with the invention, and having an element height and a reproduce track width each equal to 2 microns for reading a written trackwidth of 3 microns, and reproducing recorded signals of 150 kilobits per inch has an areal storage density of 1200 megabits per square inch; a density on the order of 10 times greater the density of the prior art.

The track width reduction to less than 10 times the MR element height introduces new parameters into the determination of the DMR signal response. In particular, the directional sense of the magnetization vectors along the longitudinal axes of the two MR elements join with the bias field direction and the signal field direction in determining the head response; that is, the head's performance is now determined by its "three dimensional" characteristics, rather than the "two dimensional" characteristics as in the prior art.

Referring to FIGS. 2a, 2b the "three dimensional" dependence of the flux propagated signal response of the DMR of the invention is illustrated. FIG. 2a is a schematic representation of a "symmetric DMR" segment comprising MR elements 36,38 having active central regions 32,34 equal to the DMR reproduce trackwidth $W_r$. For clarity in illustrating the criticalness of longitudinal biasing characteristic of the present invention, the schematically illustrated DMRs are shown without the spacer between the MR elements and without the sense current leads attached to the DMR's elements. In FIG. 2a, the sections 42,46 of MR element 38, and the sections 40,44 of the MR element 36 are the regions of the DMR where the sense current leads, if they had been shown, would contact the MR elements. If, for example, a longitudinal biasing field is applied in the same directions to the elements 36,38, in the regions 42,46 and 40,44 the resultant magnetizations 48, 50 and 52, 54 have longitudinal components that are mutually parallel. Because the leads to the MR elements are of lower resistance than the MR elements themselves, and carry most of the current in the regions 42,46 and 52, 54 there is little mutual transverse biasing in these regions, and the magnetizations remain mostly longitudinally oriented. However, in the central active regions of the elements 36,38 the mutual biasing action described above results in the rotation of the magnetization 56 of the region 34 is one direction, and the magnetization 58 of the region 32 an approximately equal amount in the opposite direction.

As described supra, the signal response of the active regions of the MR elements of the present invention is predominantly by flux propagation through the MR element. It is known in the art that such flux propagation preferentially take place along paths that are perpendicular to the bias magnetization direction. In FIG. 2a flux entering the MR element 36 tends to propagate along the direction 60 perpendicular to the magnetization 58, while flux entering the MR element 38 tends to propagate along the direction 62 perpendicular to the magnetization 56. Thus, in the "symmetric" DMR of the invention, the preferred flux propagation paths for the two elements lie at roughly right angles to each other. This is of critical importance in the determination of the "symmetric" DMR's signal response, as will be explained infra.

Referring now to FIG. 2b, the corresponding schematic representation of an "asymmetric" DMR is shown. The DMR of FIG. 2b is geometrically the same as that of FIG. 2a, consisting of corresponding MR elements 64,66 having end regions 68,70 and 72,74 respectively, and central active regions 76,78 equal to the track width $W_r$. However, in this case the elements are biased such that the longitudinal components of the bias magnetizations are anti-parallel. When sense current flows in the DMR, transverse biasing rotates the magnetization vectors 80, 82 in the central active regions 76,78 as previously described. (The magnetizations 84,86,88,90 in the end regions 68,70,72,74 are not rotated much, as explained above.) Under these conditions, the magnetization vectors 80, 82 are positioned anti-parallel to each other, unlike the symmetric DMR where they are roughly perpendicular to each other. The favored flux propagation paths 92,94 perpendicular to the magnetization vectors 80,82 are now approximately parallel rather than perpendicular to each other.

For the narrow track width DMR of the invention, the different propagation path directions of the symmetric and asymmetric configurations result in differing signal response characteristics. Referring to FIGS. 3a, 3b the theoretically computed, linearized response of the symmetric DMR to an isolated recorded transition is plotted as curve 96, and the corresponding response for the asymmetric DMR is plotted as curve 98. Comparing the amplitudes of the two responses 96,98 it is seen that the asymmetric DMR has an on-track output more than twice the magnitude of the symmetric DMR's output. Use of the asymmetric DMR is therefore preferable in a high density recording application where the playback signal amplitude is of primary concern. The shape and amplitude of the asymmetric DMR waveform 98 is also found to be much less sensitive to variation in tracking offset than is the case of the symmetric DMR waveform 96; curves 105 and 107 for offsets of −0.5 micron and +0.5 micron offsets respectively differ very little from the on-track response 98. This difference in offset sensitivities is further indicated by the waveform 101 for the symmetric DMR and the waveform 109 for the asymmetric DMR. These waveforms illustrate head response to an isolated transition recorded on an adjacent track (i,e., with the head displaced 3 microns from being directly on-track) for a reproduce trackwidth of 2 microns and a 3 micron recorded track. The amplitude of the waveform 101 shows that the symmetric DMR has considerably more adjacent track side-reading than does the asymmetric DMR, as shown in waveform 109. For the reasons of greater on-track signal, reduced sensitivity to tracking error, and lesser adjacent track side-read, the asymmetric DMR may be considered superior to the symmetric DMR.

However, the otherwise inferior characteristics of the symmetric DMR could possibly provide a unique advantage in special applications where in addition to reproducing the recorded data, the head is servoed to the recorded track by means of positioning information derived from the same playback signal. Referring again to FIG. 3a, the curve 100 shows the response of the symmetric DMR of the invention when it is offset from centering on the recorded track by +0.5 microns, and the curve 102 shows the response when offset by −0.5 microns. The sign and amplitude of the symmetric DMR playback signal may attendantly be used in generating position error information to servo the reproduce head into coincidence with the recorded track, in a manner known in the art. It is the low frequency component of the signal that provides the tracking information, and the high frequency component that provides the data information. Hence, the two components may be separated by means of appropriate filtering so that the tracking and data information may be recovered and processed in their individual channels.

BRIEF DESCRIPTION OF THE DRAWINGS

The invention and the prior art will be describe with respect to the figures, of which.

DESCRIPTION OF PREFERRED EMBODIMENTS

Figure 1:
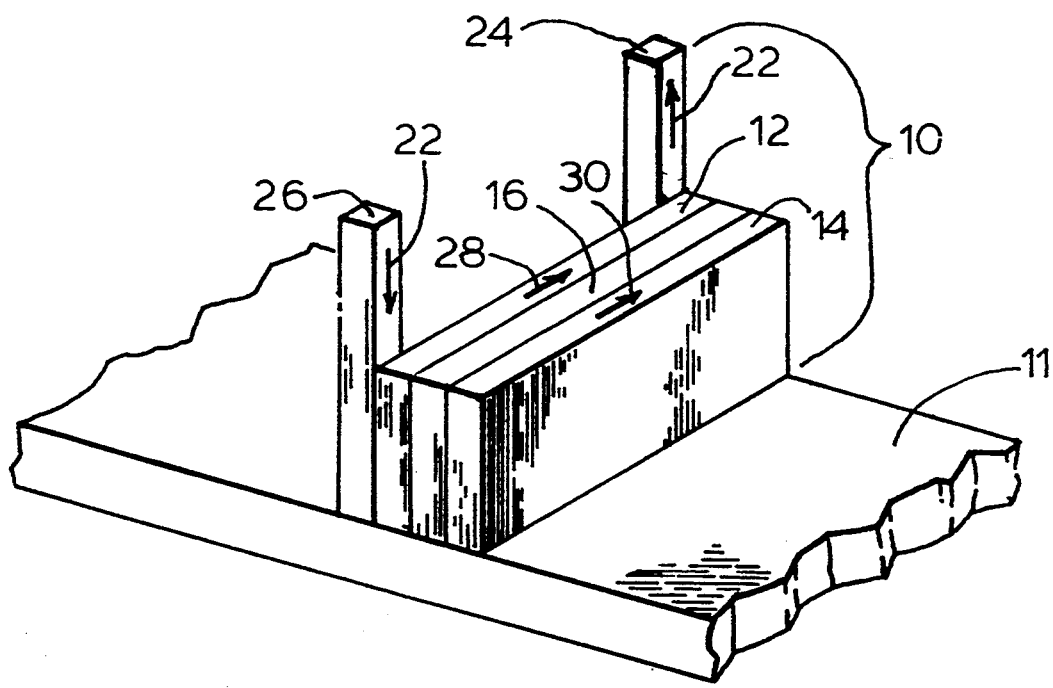
FIG. 1 illustrates a dual magnetoresistive head known in the prior art.
Figure 2A:
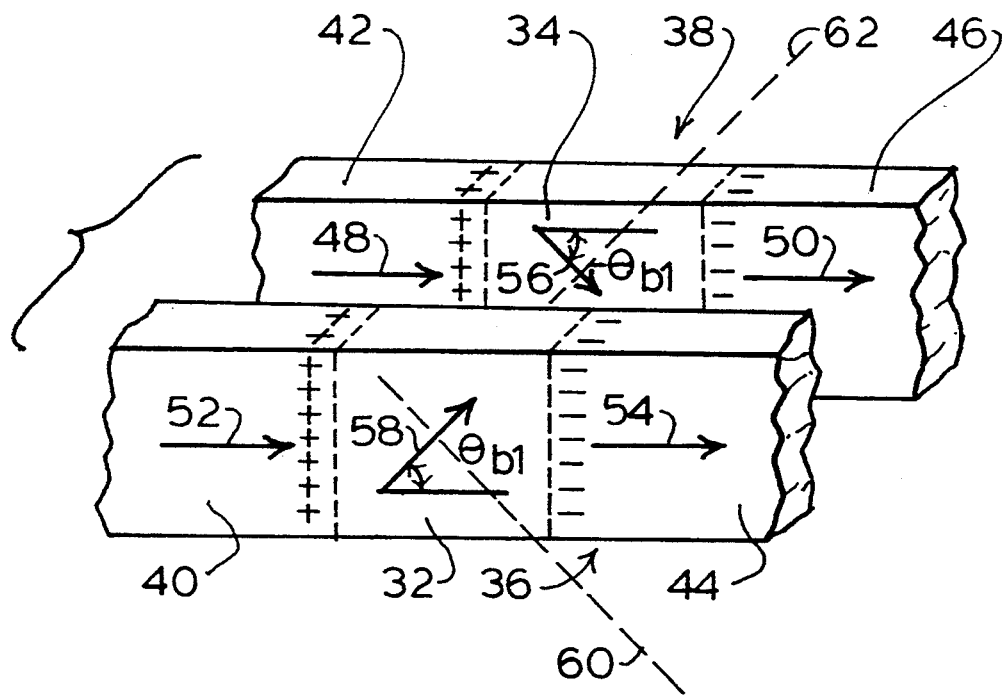
FIGS. 2a and 2b are drawings showing the biasing of the symmetric DMR and anti-symmetric DMR respectively.
Figure 2B:
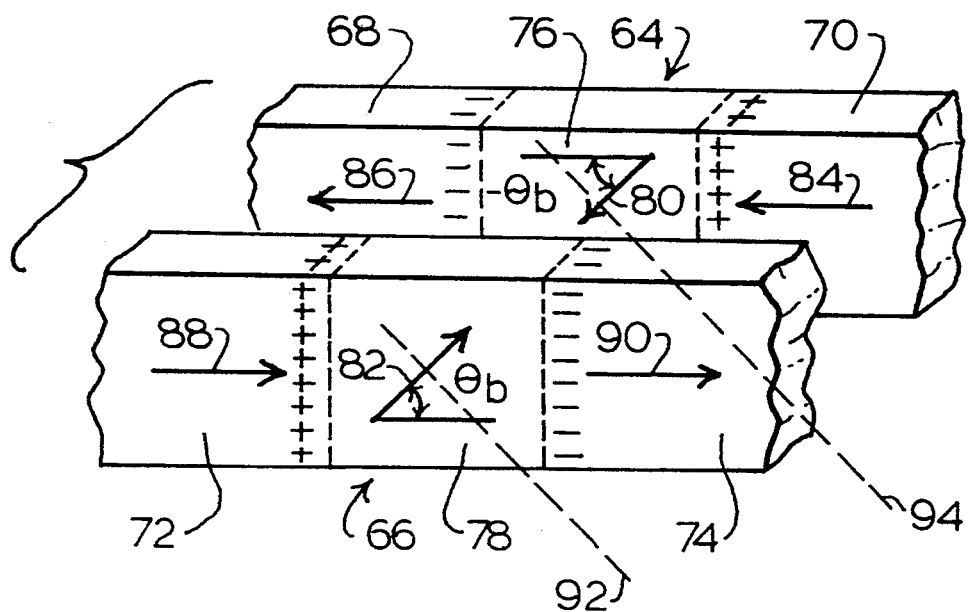
Figure 3A:
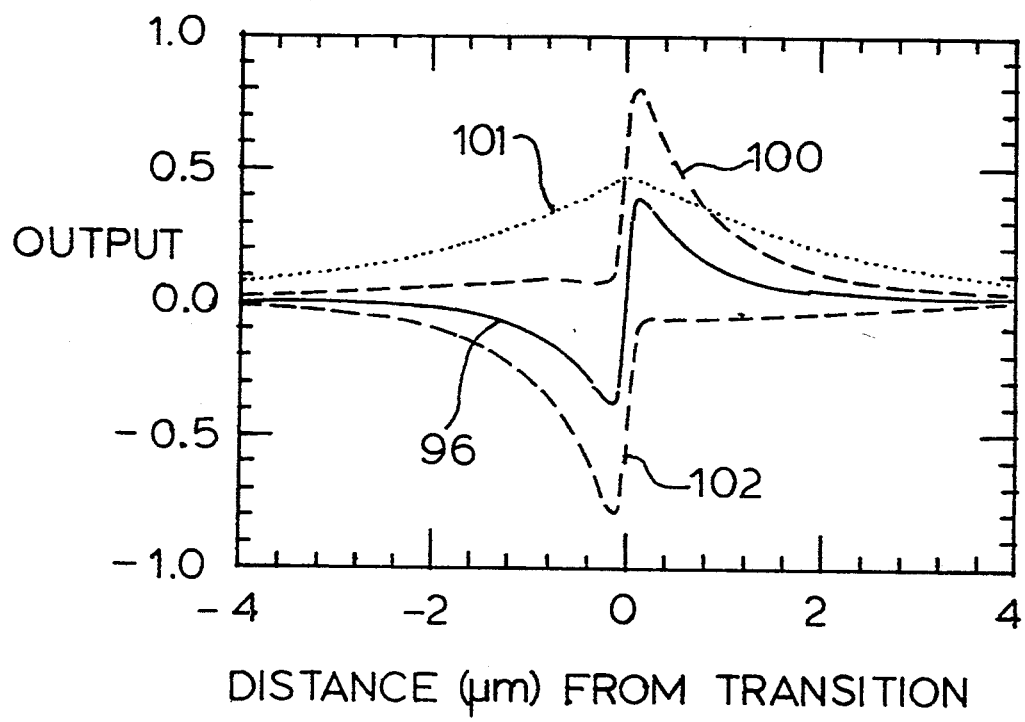
FIGS. 3a and 3b are plots of the signal output of the symmetric DMR and anti-symmetric DMR respectively.
Figure 3B:
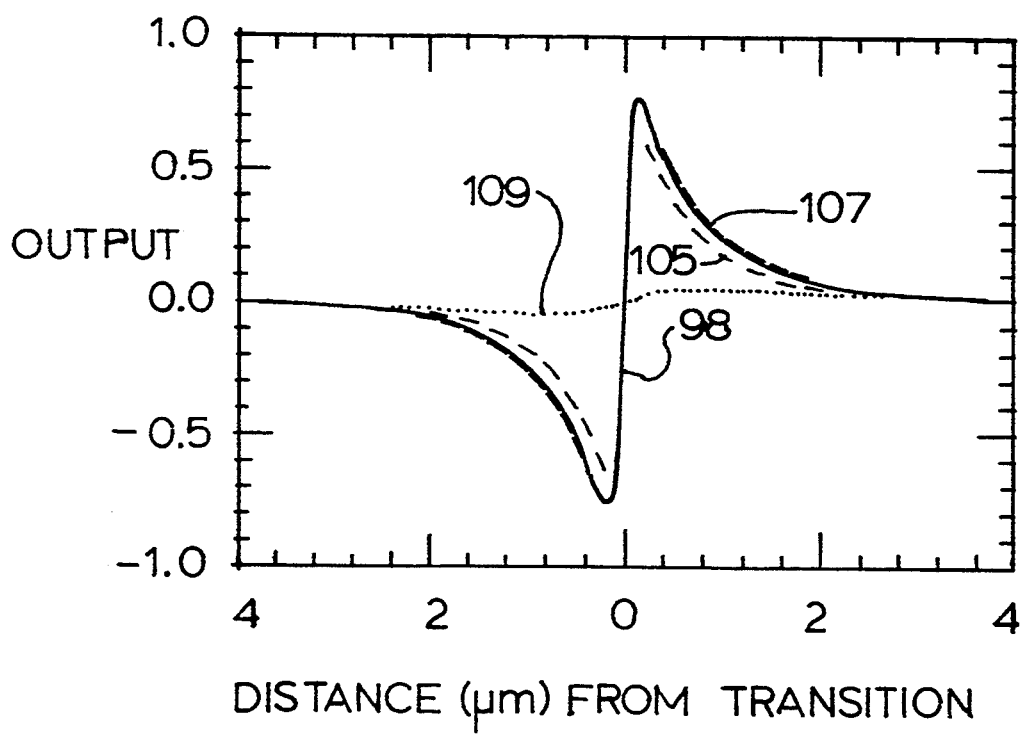
Figure 4A:
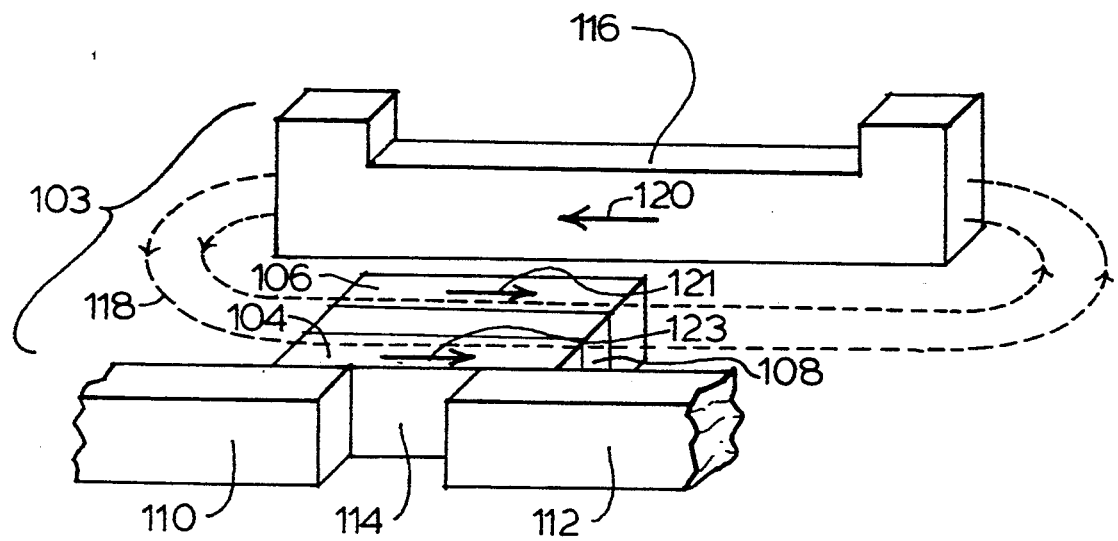
FIGS. 4a and 4b illustrate techniques for providing the longitudinal biasing of the symmetric DMR and the anti-symmetric DMR respectively.

Referring to FIG. 4a, in a first embodiment a symmetric DMR 103 comprises MR elements 104,106 separated by a conductive spacer 108 and having current leads 110,112 and a biasing magnet 116, as generally disclosed in U.S. Pat. No. 5,084,794. As described supra, the active region 114 of the DMR lies between the ends of the current leads 110,112, and the width of the active region 114 defines the track width, $W_r$ of the DMR as a reproduce head. In this preferred embodiment the height of the MR elements 104,106 and the spacer 108 are each 2 microns and the active region width 114, i.e. the DMR's track width, is also 2 microns, and in accordance with the teachings of the invention, the track width $W_r$ is less than 10 times the height of the MR elements 104,106. The MR elements 104,106 are 0.025 microns thick, and the spacer 108 has a thickness of 0.1 microns.

The longitudinal bias required in a symmetric DMR of the above dimensions is generated by a "C" shaped magnet 116 located adjacent to the MR elements 104,106. The magnet 116 may be configured to provide a purely longitudinal field 118 directed along the longitudinal axes of the MR elements 104,106 by setting its magnetization 120 longitudinally in the manner taught in U.S. Pat. No. 4,972,284, which is hereby incorporated by reference. Resultantly, the longitudinal magnetizations 121, 123 of the MR elements 106,104 respectively, are aligned in the same direction.

Figure 4B:
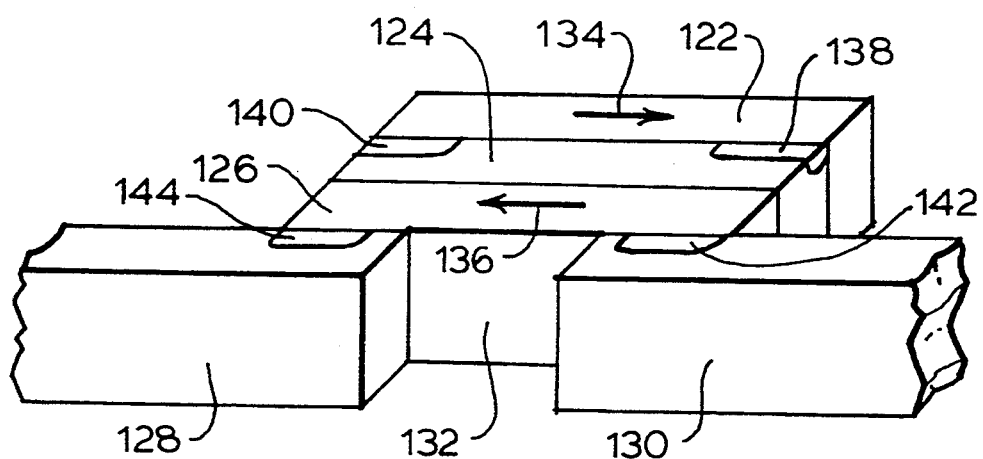

In a second embodiment of the invention, the asymmetric DMR of FIG. 4b comprises MR elements 122, 124, spacer 126 and leads 128,130 as described for the symmetric DMR supra. As in the symmetric DMR, the active region 132 of the asymmetric DMR lies between the ends of the current leads 128, 130 and the width of the active region 132 defines the track width, $W_{r'}$, of the asymmetric DMR as a reproduce head. In this embodiment the height of the MR elements 122,126 and the spacer 124 are each 2 microns and the active region width 132, i.e. the asymmetric DMR's track width, is also 2 microns, and in accordance with the teachings of the invention, the track width $W_{r'}$, is less than 10 times the height of the MR elements 122,126. The MR elements 122, 126 are 0.025 microns thick, and the spacer 124 has a thickness of 0.1 microns.

To provided the biasing required for the asymmetric DMR as described supra, the longitudinal magnetizations 134,136 of the MR elements 122,126 are oriented in opposite directions by means of the following longitudinal biasing technique. The magnetization 134, 136 of the MR elements 122,126 are "pinned" at the ends of the element by use of patterned exchange biasing. This technique is described in the article "Unshielded MR Elements with Patterned Exchange Biasing", C. Tsang, , IEEE Transactions on Magnetics, Vol. 25, No.5, Sep. 1989, pp. 3692-3694. During head fabrication, after the MR element 122 is deposited, patterned exchange layers 138, 140 of FeMn in a thickness of approximately 100 angstroms are deposited over the "ends" of the MR element 122. Either during the FeMn deposition, or after annealing, a longitudinal magnetic field applied to the structure orients the resultant exchange bias field in the selected longitudinal direction. The spacer 124 is then deposited over the MR element 122 and the exchange layers 138,140, followed by the deposition of the second MR element 126. On the "ends" of the MR element 126, a second set of patterned exchange layers 142, 144 of TbCo are deposited. (The use of TbCo as an exchange biasing layer in conjunction with a magnetoresistive layer is described in the article "Micromagnetic Model of an Exchange Coupled Ni—TbCo Bi-layer", N. Smith, W. C. Cain, Journal of Applied Physics, Vol 69, 1991, p. 2471.) The thickness of the TbCo layers 142, 144 may be equal to or greater than 1000 angstroms. The sense current leads 128, 130 are then deposited, completing the deposition of the asymmetric DMR head. For ease of fabrication, the TbCo layers can be deposited in the same magnetic field present during the deposition of the FeMn layers, and the completed DMR is then subjected to a "post-deposition" field in the opposite direction relative to the deposition field. This field switches the ferrimagnetic TbCo layers 142,144 and the MR layer 126 magnetization direction from the original direction of the magnetization 134 of the element 122. The magnetization 134 will also switch under the action of this "post-deposition" field, but on the removal of the "post-deposition" field the magnetization 134 will again reverse under the urging of the non-switchable anti-ferromagnetic exchange layers FeMn layers, 138,140. The final magnetization directions 134, 136 will then be in opposite directions as shown in FIG. 4b.

The invention has been described in detail with particular reference to preferred embodiments thereof, but it will be understood that variations and modifications can be effected within the spirit and scope of the invention.

What is claimed is:

1. A magnetic head assembly for reproducing a track of magnetically recorded information, said head assembly comprising:
    a) first and second thin film magnetoresistive sensing elements, said first and said second magnetoresistive sensing elements each having a transverse height L and a longitudinally extending length, said first and said second magnetoresistive elements having first and second unbiased magnetizations oriented along said longitudinally extending length of said first and said second magnetoresistive elements respectively,
    b) spacer means sandwiched between said first and said second magnetoresistive sensing elements,
    c) transverse biasing means for biasing said first and said second magnetoresistive sensing elements aligned along said height L such that the transverse bias component aligned along said first magnetoresistive sensing element's height is anti-parallel to the transverse bias component aligned along said second magnetoresistive sensing element's height,
    d) longitudinal biasing means for biasing said first and said second magnetoresistive sensing element along said longitudinally extending lengths of said magnetoresistive sensing elements, wherein the longitudinal bias component of said first magnetoresistive sensing element is parallel to, and in the same direction as the longitudinal bias component of said second magnetoresistive sensing element, and d) said first magnetoresistive sensing element having a first active region of width $W_r$, said second magnetoresistive having a second active region of width $W_r$, wherein $W_r$ is less than 1/10 of said height L and $W_r$ is the track width of said head, and further wherein the magnetization in said first active region is biased by said transverse bias and said longitudinal bias of said first magnetoresistive element in a first direction and the magnetization in said second active region is biased by said transverse bias and said longitudinal bias of said second magnetoresistive element in a second direction, said second direction being perpendicular to said first direction.

2. The magnetic head assembly of claim 1 wherein said longitudinal biasing means is a permanent magnet.

3. The magnetic head assembly of claim 1 wherein said transverse biasing means comprises said first and said second magnetoresistive elements serving as soft adjacent layers for mutual transverse biasing of each other.

4. The magnetic head assembly of claim 1 for use as a combined data reproduce head and on-track indicating head, wherein said head assembly provides a signal output whose amplitude and sign is a measure of mistracking of said head relative to said track.

5. The magnetic head assembly of claim 1 having a track width equal to or less than 2 microns.

6. A magnetic head assembly for reproducing a track of magnetically recorded information, said head assembly comprising:
  a) first and second thin film magnetoresistive sensing elements, said first and said second magnetoresistive sensing elements each having a transverse height L and a longitudinally extending length, said first and said second magnetoresistive elements having first and second unbiased magnetizations oriented along said longitudinally extending length of said first and said second magnetoresistive elements respectively,
  b) spacer means sandwiched between said first and said second magnetoresistive sensing elements,
  c) transverse biasing means for biasing said first and said second magnetoresistive sensing elements aligned along said height L such that the transverse bias component aligned along said first magnetoresistive sensing element's height is anti-parallel to the transverse bias component aligned along said second magnetoresistive sensing element's height,
  d) longitudinal biasing means for biasing said first and said second magnetoresistive sensing element along said longitudinally extending lengths of said magnetoresistive sensing elements, wherein the longitudinal bias component of said first magnetoresistive sensing element is anti-parallel to the longitudinal bias component of said second magnetoresistive sensing element, and
  d) said first magnetoresistive sensing element having a first active region of width $W_r$, said second magnetoresistive having a second active region of width $W_r$, wherein $W_r$ is less than 1/10 of said height L and $W_r$ is the track width of said head, and further wherein the magnetization in said first active region is biased by said transverse bias and said longitudinal bias of said first magnetoresistive element in a first direction and the magnetization in said second active region is biased by said transverse bias and said longitudinal bias of said second magnetoresistive element in a second direction, said second direction being parallel to said first direction.

7. The magnetic head assembly of claim 6 wherein said longitudinal biasing means comprises a first exchange biasing layer for longitudinally biasing said first magnetoresistive element, and a second exchange biasing layer for longitudinally biasing said second magnetoresistive layer.

8. The magnetic head assembly of claim 6 wherein said transverse biasing means comprises said first and said second magnetoresistive elements serving as soft adjacent layers for mutual transverse biasing of each other.

9. The magnetic head assembly of claim 6 having a track width equal to or less than 2 microns.

* * * * *